United States Patent
Hurtta

(10) Patent No.: US 7,623,530 B2
(45) Date of Patent: Nov. 24, 2009

(54) INDICATION OF SERVICE FLOW TERMINATION BY NETWORK CONTROL TO POLICY DECISION FUNCTION

(75) Inventor: Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 784 days.

(21) Appl. No.: 10/953,360

(22) Filed: Sep. 30, 2004

(65) Prior Publication Data

US 2005/0122945 A1    Jun. 9, 2005

(30) Foreign Application Priority Data

Nov. 20, 2003    (EP) .................................. 03026487

(51) Int. Cl.
*H04L 12/26*    (2006.01)

(52) U.S. Cl. ...................... 370/401; 370/229

(58) Field of Classification Search .............. 370/229, 370/465, 466, 252, 253, 331, 401
See application file for complete search history.

(56) References Cited

U.S. PATENT DOCUMENTS

| | | | |
|---|---|---|---|
| 6,125,106 A | 9/2000 | Östrup et al. | |
| 7,260,398 B2 * | 8/2007 | Igarashi et al. | 455/436 |
| 7,283,506 B2 * | 10/2007 | Mayer et al. | 370/338 |
| 2002/0036983 A1 * | 3/2002 | Widegren et al. | 370/230.1 |
| 2003/0003919 A1 * | 1/2003 | Beming et al. | 455/446 |
| 2003/0169725 A1 | 9/2003 | Ahmavaara et al. | |
| 2004/0223602 A1 | 11/2004 | Honkasalo et al. | |
| 2005/0085247 A1 * | 4/2005 | Bajko et al. | 455/466 |

(Continued)

FOREIGN PATENT DOCUMENTS

| | | |
|---|---|---|
| EP | 0 961 509 A2 | 12/1999 |
| EP | 1 326 459 A1 | 7/2003 |
| WO | WO 99/35865 | 7/1999 |
| WO | WO 02/32165 A1 | 4/2002 |
| WO | WO 2004/029854 A2 | 4/2004 |

OTHER PUBLICATIONS

3GPP TS 23.207 V5.7.0, "$3^{rd}$ Generation Partnership Project; Technical Specification Group Services and System Aspects; End-to-End Quality of Service (QoS) Concept and Architecture; (Release 5)", Mar. 2003, pp. 1-47.

(Continued)

*Primary Examiner*—Ricky Ngo
*Assistant Examiner*—Gary Mui
(74) *Attorney, Agent, or Firm*—Mintz, Levin, Cohn, Ferris, Glovsky and Popeo, P.C.

(57) ABSTRACT

When an authorization and/or control element like a policy control network element is involved in the authorization and/or control of a service flow in a communication connection controlled, a network control element, such as a GGSN, controlling the communication connection determines a termination of the thus authorized and/or controlled service flow and informs the policy control network element about the termination thereof. The policy control network element may then remove service attributes and/or QoS attributes related to this service flow. Furthermore, the communication connection in the communication network can be modified on the basis of stored information which represents a state before the establishment of the service flow.

56 Claims, 6 Drawing Sheets

U.S. PATENT DOCUMENTS

2007/0025358 A1* 2/2007 Beckmann et al. ..... 370/395.21
2007/0127456 A1* 6/2007 Lindemann et al. ......... 370/389

OTHER PUBLICATIONS

3GPP TS 23.207 V5.8.0 "$3^{rd}$ Generation Partnership Project; Technical Specification Group Services and System Aspects; End-to-End Quality of Service (QoS) Concept and Architecture (Release 5)".

3GPP TR 23.917 V0.7.0, "$3^{rd}$ Generation Partnership Project; Technical Specification Group Services and System Aspects; Dynamic Policy Control Enhancements for End-toEnd QoS; (Release 6)" Apr. 2003, pp. 1-31.

3GPP TS 23.917 V0.9.0, "$3^{rd}$ Generation Partnership Project; Technical Specification Group Services and System Aspects; Dynamic Policy Control Enhancements for End-toEnd QoS; (Release 6)" Jul. 2003, pp. 1-32.

* cited by examiner

INDICATION OF SERVICE FLOW TERMINATION BY NETWORK CONTROL TO POLICY DECISION FUNCTION

BACKGROUND OF THE INVENTION

1. Field of the Invention

The present invention is related to a method of controlling network resources and/or connection parameters of a communication connection in a communication network, and/or to a corresponding system and/or a corresponding network control element. The following specification is in particular directed to an indication of a service flow termination, for example, in a packet based communication network.

2. Description of the Related Prior Art

In the last years, an increasingly extension of communication networks, such as wire based communication networks like the Integrated Services Digital Network (ISDN), or wireless communication networks like cdma2000 (code division multiple access) system, cellular $3^{rd}$ generation communication networks like the Universal Mobile Telecommunications System (UMTS), the General Packet Radio System (GPRS), or other wireless communication system, such as the Wireless Local Area Network (WLAN), took place all over the world. Various organizations, for example the $3^{rd}$ Generation Partnership Project (3GPP), the International Telecommunication Union (ITU), $3^{rd}$ Generation Partnership Project 2 (3GPP2), Internet Engineering Task Force (IETF), and the like, are working on standards for telecommunication network and multiple access environments.

In general, the system structure of a communication network is such that a subscriber's user equipment, such as a mobile station, a mobile phone, a fixed phone, a personal computer (PC), a laptop, a personal digital assistant (PDA) or the like, is connected via respective transceivers and interfaces, such as an air interface, a wired interface or the like, to an access network subsystem. The access network subsystem controls the communication connection to and from the user equipment and is connected via an interface to a corresponding core or backbone network subsystem. The core (or backbone) network subsystem switches the data transmitted via the communication connection to a destination, such as another user equipment, a service provider (server/proxy), or another communication network. It is to be noted that the core network subsystem may be connected to a plurality of access network subsystems. Depending on the used communication network, the actual network structure may vary, as known for those skilled in the art and defined in respective specifications, for example, for UMTS, GSM and the like.

Generally, "connections" may be discriminated into various types. For example, one type of connection is a connection between a user equipment and another user equipment/database/server/etc. Another type of connection is between the user equipment and e.g. a GGSN (Gateway GPRS Support Node) of a GPRS (General Packet Radio Services) system. In both cases the user equipment is involved but the respective terminating endpoint of the connection is different. Basically, for properly establishing and handling a connection between network elements such as the user equipment and another user equipment, a database, a server, etc., one or more intermediate network elements such as connection control nodes, support nodes and/or service nodes can be involved. One or more connection parameters are used for defining connection characteristics. This includes, for example, in case of the establishment of a packet based data transmission protocol, such as a PDP (Packet Data Protocol) context, the definition of information about quality of service (QoS) requested or provided (such as a traffic class, an allocation/retention priority, a traffic handling priority, a guaranteed bitrate, a maximum bitrate and the like), charging-related information, such as a charging class, etc.

Furthermore, it is possible to establish, via a communication connection, different types of services for the user. Data to be transmitted in connection with these services are sent, for example, by packets in service flows from one network element to another. As an example for these services, non real-time services and real-time services, such as email, downloading, browsing, streaming, IP multimedia services and the like can be named.

In particular in cases where a communication connection involves two or more networks of different types such as networks using different transmission protocols, e.g. GPRS/UMTS-based networks and IP-based networks, problems may occur in properly establishing the communication connection and setting the communication connection parameters such that they are optimal for the service in question.

Hitherto, there have been proposed several concepts for achieving a solution therefor. For example, in the case of a 3GPP based network, such as UMTS/GPRS, the following solutions are proposed.

Generally, communication connection parameters and resources, such as a QoS authorization, may be requested for a communication connection, e.g. with regard to a respective PDP context activation and/or modification. Furthermore, there are also proposals to request respective parameters and resources for separate service flows using the communication connection. These parameters and resources for separate service flows may be different to those originally requested and provided for the PDP context, for example.

While in a standard 3GPP system QoS is defined per Access Point Name (APN), in 3GPP Release 5 (see, for example, 3GPP specification TS 23.207, ver5.7.9 (2003-03)), a so-called Policy Decision Function (PDF) is introduced for dynamically authorizing of QoS for services provided by the IP Multimedia Subsystem (IMS). IMS specific information, Authorization Token and Flow ID(s) are used as binding information when requesting QoS authorization for a PDP context. According to 3GPP Release 5, the PDF (or also Policy Control Function PCF) is described to be implemented together with a Proxy Connection State Control Function (P-CSCF) of the IMS.

Regarding the basic communication between a GGSN (Gateway GPRS Support node) and a PDF, reference can also be made to the International patent application No. WO 02/32165 of the applicant.

In 3GPP Release 6 (see, for example, 3GPP specification TR 23.917, ver0.7.1 (2003-02)), it is planned to extend the dynamic QoS authorization to include also other services than those provided by the IMS, e.g. streaming services (for example, Packet Switched Streaming Services (PSS)). Furthermore, according to the current understanding of 3GGP Release 6, a stand-alone Policy Decision Function (PDF) with standardized interfaces towards both the GGSN (the so-called Go-interface) and the Application Function, e.g. IMS/PSS server/proxy (the so-called Gq-interface) are planned.

Thus, it is to be noted that in 3GPP Release 5 and 3GPP Release 6 solutions, a dynamic QoS control for a communication connection is possible for session-based services, and in particular real-time services such as Voice over IP (VoIP). More generally, PSS streaming service is planned to be added to dynamically authorized services in 3GPP Release 6, in addition to IMS services of 3GPP Release 5.

Another approach for enhancing QoS support for IP services is the usage of so-called service aware core network element, such as a service aware GGSN (saGGSN), or the usage of so-called Intelligent Service Nodes (ISN). The saGGSN and the ISN are service aware products which can provide, for example, specific charging functions. A GGSN provides charging per PDP context whereas service specific charging functions, as one example, can operate on a service flow level. The saGGSN and the ISN are currently under definition. A saGGSN allows for the detection of the QoS level at the network edge for selected services. With these enhanced core network elements, QoS can be controlled on a communication connection (e.g. PDP context) basis, or on a service access point (sAP) basis, or on a service basis within a sAP, or on a service flow basis within a service.

When a communication connection is terminated, usually, the resources allocated to the communication connection are to be released in the network. Conventionally, in a case where the communication connection is established by a PDP context, such a release process is commonly known to persons skilled in the art. On the other hand, when for example a PDF is involved for authorizing service flows for a communication connection using a PDP context, the following procedure is implemented. When the PDP context is to be released, the network control element, such as the GGSN, sends a corresponding indication to the PDF. Otherwise, the user equipment only can terminate specific service flow(s) in a PDP context. When the GGSN receives a corresponding release instruction from the user equipment, it sends a new request with a further set of binding information to the corresponding PDF. This binding information does not comprise the binding for the service(s) flow being terminated. Then, the (new) service flows being requested by the new set of binding information are processed (authorized) by the PDF accordingly.

However, present existing terminals usually do not support simultaneous PDP contexts, but only one PDP context can be supported. Thus, when there is a need to use several types of services at the same time, all the service flows have to be carried inside the same PDP context. However, when several service flows are carried inside one PDP context, there are no effective methods for network control elements/entities or nodes such as the GGSN, for example, to detect the termination of one service flow, to control PDP context parameters, such as QoS parameters, and to modify the PDP context parameters back to the earlier values after termination of one service flow.

SUMMARY OF THE INVENTION

It is a general purpose of the present invention to provide a new mechanism by means of which an improved control of network resources is possible, in particular with regard to the release of one or more service flows.

Thus, an improved mechanism is proposed which is applicable for managing and controlling communication connection parameters and network resources for a packet based communication connection in a case where at least one service flow being authorized by a PDF involved in the communication connection is to be terminated.

In particular, according to one aspect provided in the present specification, there is proposed, for example, a method of controlling network resources of a communication connection in a communication network, the method comprising: providing a network having a first network element for controlling the communication connection, and a second network element for performing an authorization for the communication connection controlled by the first network element, wherein the second network element has authorized and/or controlled one or more service flows for the communication connection which is established via the communication connection; determining, by the first network element, a termination of at least one of the service flows authorized and/or controlled by the second network element; informing, by the first network element, the second network element about the termination of the at least one of the service flow authorized and/or controlled by the second network element; and processing, by the second network element, the information about the termination of the at least one of the service flows.

Furthermore, according to one aspect provided in the present specification, there is proposed, for example, a system for controlling network resources of a communication connection in a communication network, the system comprising: a first network element for controlling a communication connection; and a second network element for performing an authorization and/or control for the communication connection controlled by the first network element, wherein the second network element is configured to authorize and/or control one or more service flows for the communication connection which is established via the communication connection; the system further comprising in the first network element, determining means for determining the termination of at least one of the service flows authorized and/or controlled by the second network element, and informing means for informing the second network element about the termination of the at least one of the service flows authorized and/or controlled by the second network element; and in the second network element, receiving means for receiving and processing means for processing the information about the termination of the at least one of the service flows.

Moreover, according to one aspect provided in the present specification, there is proposed, for example, a network control element for controlling network resources of a communication connection in a communication network, the communication network comprising a second network element for performing an authorization and/or control for the communication connection controlled by the network control element, wherein the second network element is arranged to authorize and/or control one or more service flows for the communication connection which is/are established via the communication connection, the network control element comprising: determining means for determining the termination of at least one of the service flows authorized and/or controlled by the second network element; and informing means for informing the second network element about the termination of the at least one of the service flows authorized and/or controlled by the second network element.

Additionally, according to one aspect provided in the present specification, there is proposed, for example, a network control unit for controlling network resources of a communication connection in a communication network, the network control unit comprising a second entity for performing an authorization and/or control for the communication connection controlled by the network control unit, wherein the second network entity is arranged to authorize and/or control one or more service flows for the communication connection which is/are established via the communication connection, the network control unit further comprising: determining means for determining the termination of at least one of the service flows authorized and/or controlled by the second network entity; and informing means for informing the second network entity about the termination of the at least one of the service flows authorized and/or controlled by the second network entity.

According to further refinements, the proposed solution may comprise one or more of the following features:

the processing of the information about the termination of the at least one of the service flows may comprise a removing, by the second network element, communication connection attributes and/or service attributes related to the at least one of the service flows;

when the at least one of the service flows is terminated, the communication connection in the communication network may be modified;

the determination of the termination of the at least one of the service flows authorized and/or controlled by the second network element may be achieved by monitoring, by the first network element, a data transmission in the one or more service flows authorized by the second network element;

the termination of the at least one of the service flows may be determined when a specific context indicating the closing of a connection is detected in the data transmission in a service flow;

the termination of the at least one of the service flows may be determined when it is detected that no packets of the at least one of the service flows are carried on the communication connection for a predetermined time;

the information of the second network element about the termination of the at least one of the service flows authorized and/or controlled by the second network element may be effected by sending a message of a specific type from the first network element to the second network element which message identifies the at least one of the service flows determined to be terminated;

the modification of the communication connection in the communication network may comprise an allocation, in the communication network, of communication connection parameters being stored in the first network element to the communication connection;

the modification of the communication connection in the communication network may comprise a transmission of communication connection parameters being stored in the second network element from the second network element to the first network element in response to the information about the termination of the service flow, and an allocation, in the communication network, of the communication connection parameters received from the second network element to the communication connection;

in the latter two cases, the communication connection parameters may be equivalent to communication connection parameters before the establishment of the at least one of the service flows;

the communication network may use a packet based data transmission;

the first network element may be a gateway network node, and in particular a Gateway GPRS Support Node; optionally, the first network element (or network control unit) and the second network element or entity are implemented in one network part, such as the GGSN.

By virtue of the proposed solutions, the following advantages can be achieved:

The control mechanism according to the present specification may be implemented for different types of communication networks, in particular for those using packet based data transmissions. For example, but not exclusively, the proposed solution is applicable in wired communication networks, such as ISDN, in networks using Asymmetric Digital Subscriber Line (ADSL) technique, in wireless communication networks, such as WLAN, GPRS, UMTS, cdma2000, and the like. In particular, the mechanism according to the present specification can be implemented, for example, in core network elements, such as communication control or gateway network elements, and in connection parameter control functions or authorization and/or control elements, such as policy control entities or policy decision functions (PDF).

By means of the mechanism defined in the present specification, also in non-session based applications, network resources allocated to specific service flows can easily be released when a corresponding network flow is determined to be terminated.

By means of the mechanism defined in the present specification, the state of the communication connection, for example the QoS allocated to the communication connection, can easily be reestablished after the termination of a service flow having different QoS attributes. In other words, it is not necessary to negotiate and allocate completely new connection parameters (e.g. QoS) to the communication connection, but it is possible to reuse the parameters which were allocated before the establishment of the service flow now being terminated, and to modify the communication connection correspondingly. This saves time and reduces the network load.

By providing both possibilities for storing the original communication connection parameters (i.e. those before the establishment of the service flow in question) in either the network control element (e.g. the GGSN) or the authorization and/or control element or policy decision function (PDF), the network architecture can be adjusted to the requirements of network design. Furthermore, it is possible to reduce the operation load and/or memory requirements for the respective network element (GGSN or PDF).

The communication connection parameters can be adjusted according to the services for the communication connection. For example, in the beginning, e.g. at a PDP context activation, QoS is agreed for the communication connection. No service flow is active at this time. Because the network has no information about upcoming services, the network may agree, for example, non real-time QoS for the communication connection. When a service flow requiring different QoS, e.g. real-time QoS, is identified, the communication connection may be modified and real time QoS may be agreed. When the service flow is terminated, the QoS of the communication connection may be modified back to the earlier, i.e. non real-time QoS.

The above and still further objects, features and advantages of the invention will become more apparent upon referring to the description and the accompanying drawings.

DESCRIPTION OF PREFERRED EMBODIMENTS

In the following preferred embodiments of a communication connection parameter or network resource control mechanism according to the present specification are described. However, it is to be noted that the invention is not confined to the examples presented herein below but may enclose also other examples as mentioned later.

The communication connection parameter or network resource control mechanism is used for controlling communication connection parameters, such as quality of service parameters, policy parameters for charging, and the like, for a communication connection between two network elements and/or entities, in particular in a case where service flows for the communication connection are authorized by a specific authorization network element like a PDF and at least one of the service flows is terminated. It is to be noted that the present invention is applicable to different types of connection, i.e. to connections having different types of endpoints, as mentioned above. Basically, the proposed mechanism is applicable to various types of connections, i.e., for example, to communication connections like a PDP context connection and to application level connections like a IMS session.

It is to be noted that the (terminal) network elements involved in the communication connection may be located in different communication networks or PLMN (Public Land Mobile Network) or within the same communication network, such as ADSL, UMTS, GPRS, WLAN, cdma2000 or the like, based networks wherein the communication networks of the network elements may be, but does not need to be of different types.

Figure 1:
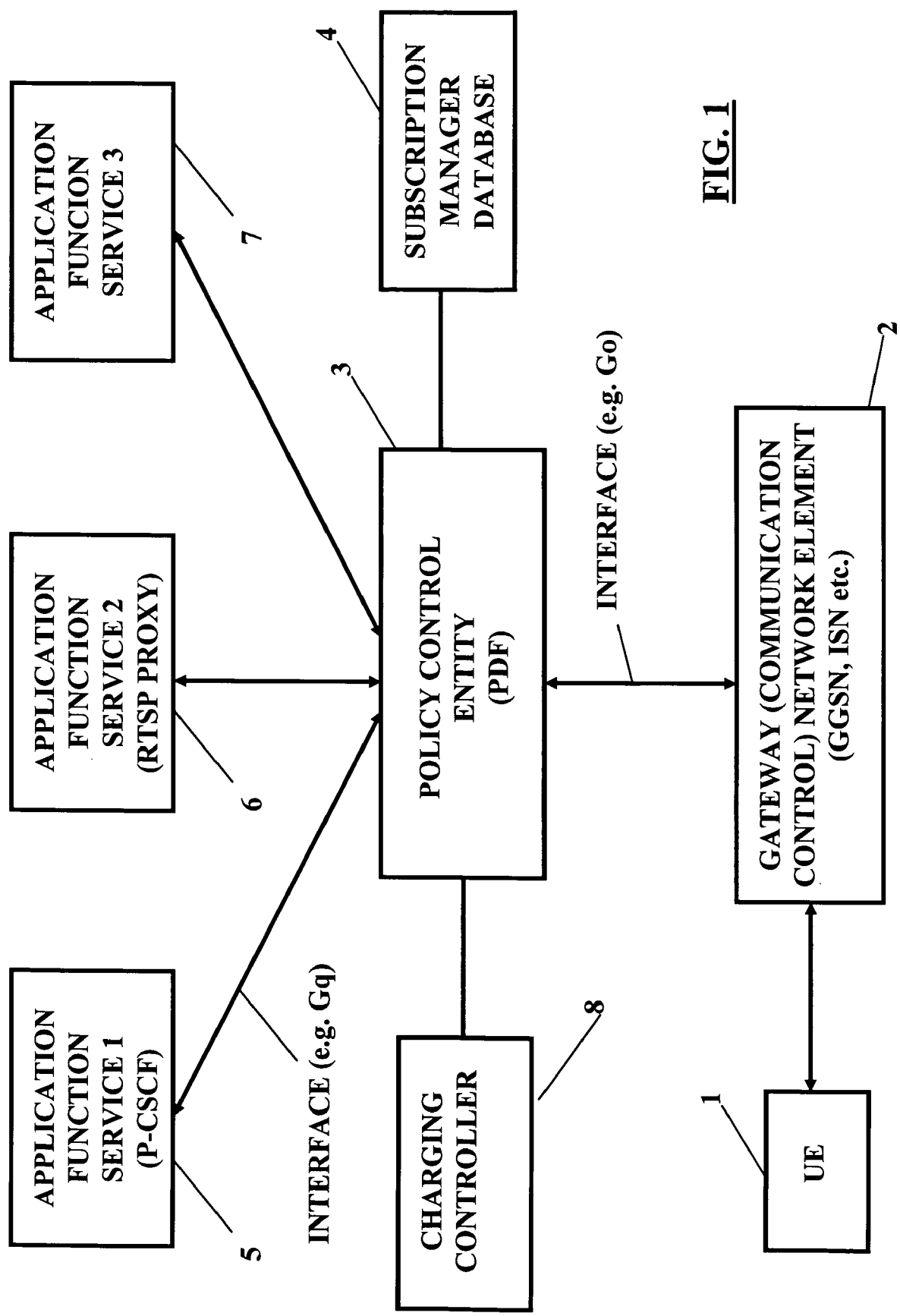
FIG. 1 shows a structure of a part of a communication network to which an embodiment of the invention is applicable.

With reference to FIG. 1, an example for a communication connection scenario is shown by means of which an implementation of the proposed communication connection parameter control mechanism is described. In this example, it is assumed that the connection parameter management or control is performed for a communication connection of a user equipment UE in a mobile communication network, such as a 3GPP based network. However, it is to be understood that this example is not intended to limit the communication connection parameter management or control application. Rather, the communication connection parameter control is also applicable in network structures different to the one described below wherein respective other types of signaling and network elements or entities are used for the functions of the communication control or gateway network element and the authorization network element like the policy control entity.

Since the described connection parameter control mechanism is related in particular to an interaction between the core network communication control or gateway network element, such as the GGSN, and the authorization network element like the policy control entity, such as the PDF, the following description is concentrated on these parts of the communication network. However, it is to be understood that for the establishment of the communication connection other network elements are involved, such as a Service GPRS Support Node (SGSN) and a Radio Access Subsystem controlled by a Radio Network Controller (RNC) (both are not shown in FIG. 1). The additional network elements and the configuration of a corresponding communication path are described, for example, in corresponding specifications, such as the 3GPP specifications, which are known for person skilled in the art, so that a detailed description thereof is omitted herein for the sake of simplicity.

In FIG. 1, a simplified structure of a communication network is shown in which the connection parameter control is implemented. In FIG. 1, reference sign 1 denotes a user equipment UE, such as a mobile phone or the like, which represents a terminal network element. Reference sign 2 denotes a gateway or communication control network element (first network element), such as a GGSN, which may be located in the core network subsystem of the communication network of the UE 1. Reference sign 3 denotes an authorization network element or policy control entity such as a PDF (e.g. a so-called ISPC) (second network element). Reference sign 4 denotes a subscription manager database connected with the policy control entity 3 and storing, for example, user subscription profiles used for the connection parameter decision by the policy control entity 3. Reference sign 8 denotes a charging control database connected with the policy control entity 3 and storing, for example, charging rules used for the connection parameter decision by the policy control entity 3. Reference signs 5 to 7 denote respective application function of services 1 to 3 with which the UE 1 may establish a communication connection using at least one service type, such as a real-time or a non-real-time service. The application functions may serve as terminating network elements for a communication connection/service flow or may provide a further connection to a corresponding terminating network element being connected therewith. Specifically, reference signs 5 denotes a P-CSCF located in a (not shown) IMS, reference sign 6 denotes a Real Time Streaming Protocol (RTSP) Proxy/Server, while reference sign 7 denotes another applicable Application Function. It is to be noted that there may be provided also other application functions or communication networks (not shown) with which the UE 1 may be connected.

For the communication connection and the transmission of signaling messages, respective connections and interfaces between the network elements are provided. The connection between the UE 1 and the GGSN 2 is provided, for example, by means of respective access network (e.g. UTRAN) and core network (e.g. SGSN) subsystems and elements, while the interface between the GGSN 2 and the PDF 3 is a network internal connection.

A respective user equipment (UE) for which the communication connection is to be established may be a terminal apparatus of different type. For example, the UE may be a mobile or fixed phone, a personal computer, a server, a mobile laptop computer, a personal digital assistant (PDA) or the like. Irrespective of its specific type, the UE may comprise several means which are required for its communication functionality. Such means are for example a processor unit for executing instructions and processing data for the communication connection (e.g. transmission content and signaling related data), memory means for storing instructions and data, for serving as a work area of the processor and the like (e.g. ROM, RAM, EEPROM, and the like), input means for inputting data and instructions by software (e.g. floppy diskette, CD-ROM, EEPROM, data interface means, and the like), user interface means for providing monitor and manipulation possibilities to a user (e.g. a screen, a keyboard, a microphone and headset for communication, and the like), and network interface means for establishing a communication connection under the control of the processor unit (e.g. wired or wireless interface means, an antenna, and the like). These means can be integrated within one device (e.g. in case of a mobile or fixed telephone) or in several devices forming the user equipment (e.g. in case of a laptop).

When a communication connection by using a service type, such as a real-time (for example, Voice over IP call) or a non-real-time service (for example, interactive connection such as browsing) between the first UE and the second UE is to be established, in the case of a first UE originating a service, the first UE initializes the communication connection. This is effected, for example, by sending a communication connection request signaling for at least one service type which is desired to be used in the communication connection to the communication network to which the first UE is connected. More specifically the UE performs a communication connection activation by sending, for example, a packet based data transmission protocol context, such as a Packet Data Protocol (PDP) context, request via an access network subsystem of the connected communication network to the core network subsystem of the connected communication network. The structures of the access network subsystem and core network subsystem depend on the respective communication network type. For existing system, these structures are commonly known for a person skilled in the art. In case of a 3GPP network system, for example, a UMTS Terrestrial Radio Access Network (UTRAN) and/or a GSM/EDGE Radio Access Network (GERAN) on the access network subsystem side as well as a Serving GPRS Support Node SGSN, a Home Location Register HLR, a Gateway GPRS Support Node GGSN and the like on the core network subsystem side may be involved.

The terminating point of the communication connection is, for example, an application function (AF) being part of an application server or an application proxy server. The second network element is, for example, part of a multimedia system, such as an IP Multimedia System (IMS) or the like, like a Proxy Call State Control Function (P-CSCF).

The communication connection request signaling for at least one service type is received in the core network subsystem by a corresponding first network element, for example a communication control or gateway network element of the core (or backbone) network subsystem like a GGSN (or SGSN) in case of a UMTS network, an ISN, a corresponding WLAN communication control network element like a Packet Data Gateway, or the like. The communication control or gateway network element may be able to trigger a request for a dynamic policy control. Now, in order to authorize the connection parameters for the communication connection, the first network element (GGSN) requests a corresponding authorization for the connection parameters from a second network element (PDF). The first network element may be able to trigger a corresponding request to the second network element without having an authorization token or the like. However, it is to be noted that also an authorization token may be used. In other words, an authorization token, service information like service name (e.g. emergency service, service related signaling, news, weather etc.), packet classifier and the like can be used as binding information. The second network element is preferably a policy control function element or entity, being for example a generalization of a 3GPP standard policy decision function (PDF) like so-called IP Service Policy Control (ISPC) element. In the following, both PDF and ISPC refer to the generalized PDF. The policy control entity is, for example, a separate network element connected via respective interfaces to other network elements, such as the gateway element and the application functions, or an integrated part of one of these network elements (for example, the P-CSCF, and the like).

The network elements used as the first and the second network element, such as the GGSN, an intelligent service node ISN, a service-aware GGSN, the PDF (the ISPC), and the like, may be implemented by software or by hardware. In any case, for executing their respective functions, correspondingly used devices or network elements comprise several means which are required for control and communication functionality. Such means are, for example, a processor unit for executing instructions and processing data (for example, transmission content and signaling related data), memory means for storing instructions and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), and interface means for establishing a communication connection under the control of the processor unit (e.g. wired and wireless interface means, an antenna, and the like). In this connection, it is to be noted that the PDF/ISPC represents (optional) network elements or entities not being directly involved in the establishment of a communication connection.

The policy control entity is arranged to authorize connection parameters, such as a quality of service QoS level and/or charging level, for the communication connection for network control element, i.e. the GGSN, by means of a corresponding signaling between these two elements. The signaling comprises, for example, a corresponding request from the GGSN identifying connection parameters like an identification of the UE, such as an International Mobile Subscriber Identity (IMSI), an IP address of the UE, a mobile subscriber ISDN (MSISDN) or the like of the UE. Furthermore, an identification of a context access point of the communication connection may be included. After deciding on a corresponding authorization for connection parameters for the communication connection and on service types which can be provided for the communication connection of the UE, which decision is based, for example, on a user subscription profile stored in the subscription manager database connected to the PDF, the PDF sends a corresponding decision message to the GGSN indicating the authorization.

The above described authorization procedure is also applicable for the authorization of one or more service flows which are also authorized by the PDF for the communication connection (e.g. PDP context).

The GGSN receives the decision message from the PDF and processes the decision message in order to determine the connection parameters authorized, for example the authorized QoS level. Then the GGSN, as the communication control network element, enforces the authorized connection parameters in the communication connection of the first network element. During the communication connection, the first network element then receives flows in the service(s) authorized for the communication connection.

On the other hand, the first network element, i.e. the GGSN, is also arranged to determine when a service flow is terminated. This means that the GGSN can become aware of a situation in which a corresponding service flow is ended, for example, when a user terminates a multimedia session with an IMS server or the like. This termination of a service flow can take place even if the communication connection as such is not terminated, i.e. the PDP context remains established. Also, the termination of one session flow is recognizable by the GGSN even if other service flows (which may also be authorized by the PDF) remain established. The processing of such a termination of a service flow is described below with reference To FIG. 2.

Figure 2:
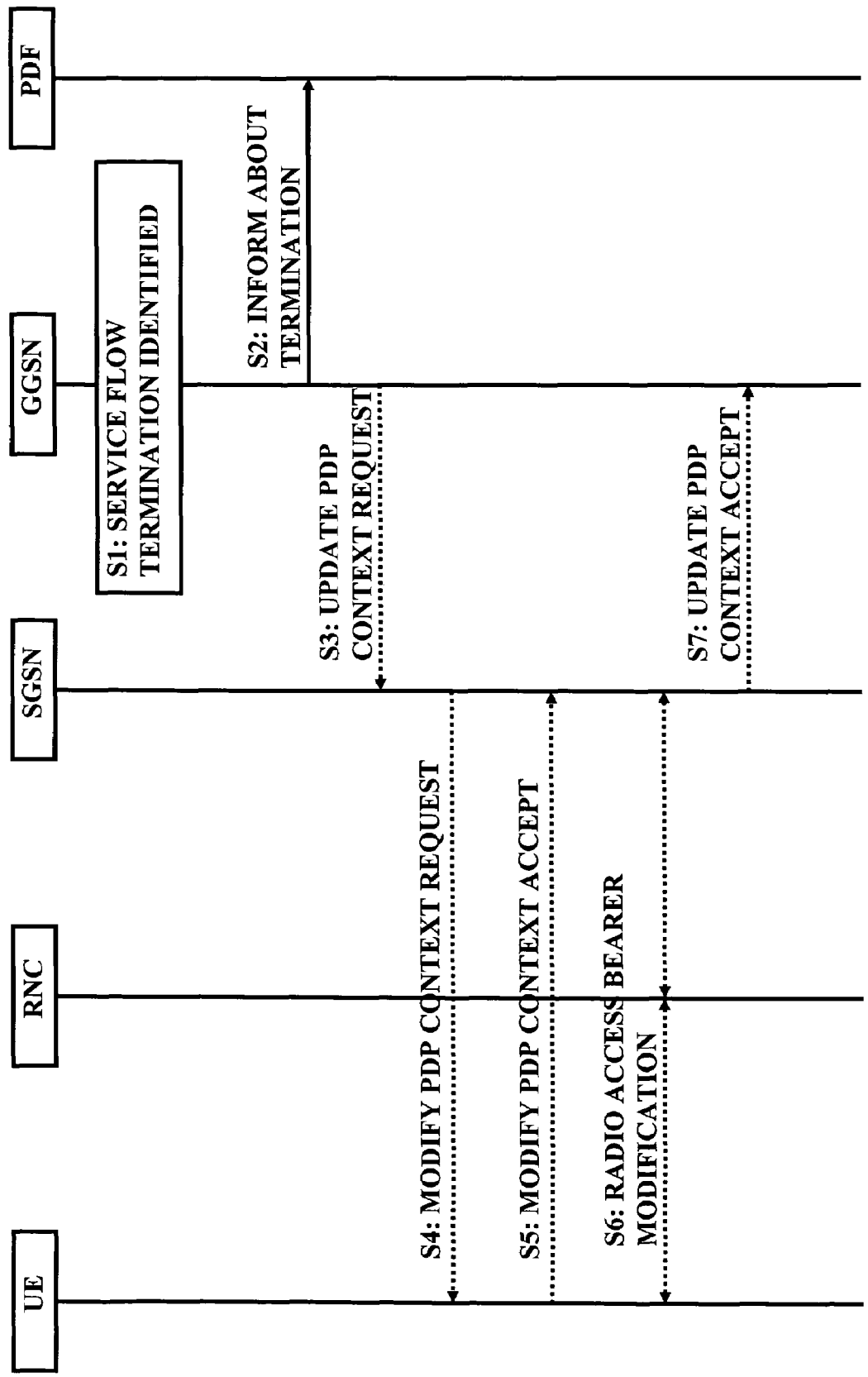
FIG. 2 shows an example of a signaling diagram illustrating a mechanism for the termination of a service flow.

In the signaling diagram of FIG. 2, the network resource control mechanism according to a preferred embodiment when a service flow is terminated is illustrated.

Assuming a case where the PDF was involved in the authorization of a service flow. In such a case the PDF may have stored service/QoS attributes used for authorizing this service flow. It is to be noted that a corresponding authorization may also be effected for further service flows for a communication connection controlled by the GGSN.

Designated by step S1, the GGSN identifies that the service flow (or one of the service flows) authorized by the PDF is terminated. This determination is performed by the GGSN, for example, by monitoring the data transfer via the service flow(s). For example, when the service flow corresponds to a TCP (Transmission Control Protocol) connection, this determination can be achieved by identifying specific packets closing the TCP connection. As another alternative, the GGSN may also identify such a service flow termination after a certain inactivity time during which no packets of the service flow are carried on the PDP context. It is to be noted here that also other alternatives for detecting the termination of the service flow may be utilized in connection with this step 1.

Then, in step S2, the GGSN sends a corresponding information about the flow termination to the PDF. This information may have the form of a Report State message. Another possibility is to use a corresponding Request message by means of which the termination of the service flow is indicated. The information preferably comprises Binding Information which identifies the service flow to be terminated, e.g. by means of the corresponding service name or by means of a sAP (service Access Point) identification and a corresponding packet classifier.

When the PDF receives the information about the service flow termination, it may perform a processing (not shown) for identifying this service flow (or flows) terminated and removes, for example, the service/QoS attributes related to the transmitted Binding Information.

In next steps S3 to S7, the network (by the GGSN as a network control element) may initialize a modification of the communication connection (the PDP context). Such a modification includes, for example, the reestablishment of the communication connection with the QoS which was allocated before the service flow being terminated was identified. The respective (earlier) QoS information can be stored in a storage means (not shown) of the GGSN and retrieved therefrom. The storage of the QoS information (or any other communication connection information or parameter) may be executed just before the establishment of a service flow (or service flows) whose termination is detected later in step S1. The GGSN sends, in step S3, an Update PDP context request message to the SGSN for initiating the modification (updating) of the communication connection. This Update PDP context request message indicates the earlier QoS being stored in the GGSN. In step S4, the SGSN sends a corresponding Modify PDP context request to the UE. When the UE is prepared to accept the modification of the communication connection (i.e. the earlier QoS), it answers in step S5 with a corresponding Modify PDP context accept message to the SGSN. Furthermore, a Radio Access Bearer modification procedure between the UE, the RNC and the SGSN is executed (step S6). In step S7, an Update PDP context accept message is send from the SGSN to the GGSN for indicating the acceptance of the modification of the communication connection.

Figure 3:
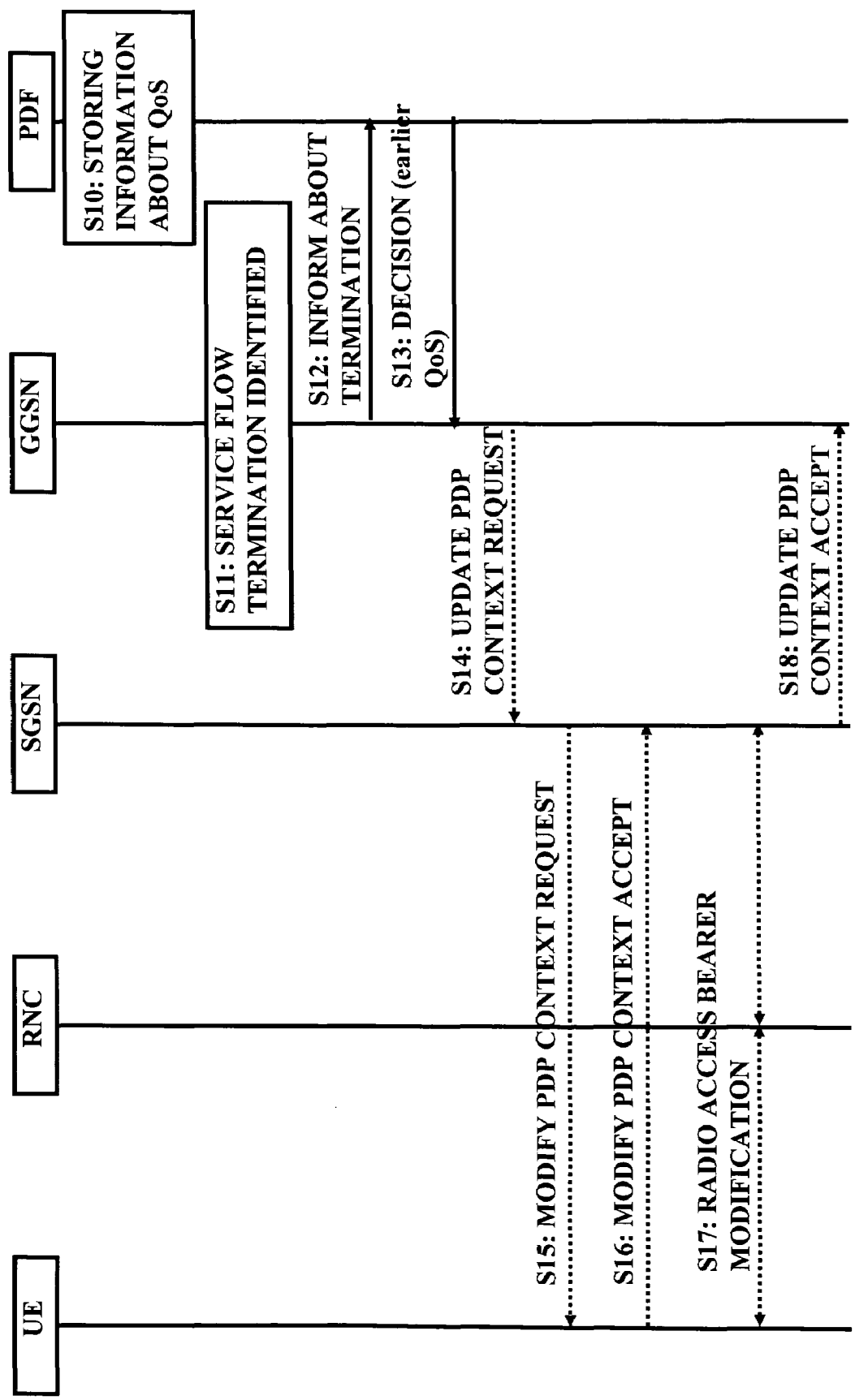
FIG. 3 shows another example of a signaling diagram illustrating a mechanism for the termination of a service flow.

Now, with reference to FIG. 3, a further example for a termination of a service flow is described. This example represents an alternative to the above described procedure of FIG. 2, wherein in the present example QoS information are not stored earlier in the GGSN but in the PDF.

Similarly to the case described in FIG. 2, a case shall be assumed where the PDF was involved in the authorization of a service flow. In such a case the PDF may have stored service/QoS attributes used for authorizing this service flow. It is to be noted that a corresponding authorization may also be effected for further service flows for a communication connection controlled by the GGSN.

In step S10, the PDF stores the information about the earlier QoS for this communication connection in an associated storing means (not shown). The storage of the QoS information (or any other communication connection information or parameter) may be executed just before the establishment of a service flow (or service flows) whose termination is detected (as described later in step S11). Then, designated by step S11, the GGSN identifies that the service flow (or one of the service flows) authorized by the PDF is terminated. This determination is performed by the GGSN, for example, by monitoring the data transfer via the service flow(s). For example, when the service flow corresponds to a TCP (Transmission Control Protocol) connection, this determination can be achieved by identifying specific packets closing the TCP connection. As another alternative, the GGSN may also identify such a service flow termination after a certain inactivity time during which no packets of the service flow are carried on the PDP context. It is to be noted here that also other alternatives for detecting the termination of the service flow may be utilized in connection with this step 11.

Then, in step S12, the GGSN sends a corresponding information about the flow termination to the PDF. This information may have the form of a Report State message. Another possibility is to use a corresponding Request message by means of which the termination of the service flow is indicated. The information preferably comprises Binding Information which identifies the service flow to be terminated, e.g. by means of the corresponding service name or by means of a sAP (service Access Point) identification and a corresponding packet classifier.

When the PDF receives the information about the service flow termination, it may perform a processing (not shown) for identifying this service flow (or flows) terminated and removes, for example, the service/QoS attributes related to the transmitted Binding Information. Furthermore, in step S13, the PDF sends, after it has received the information about the service flow termination in step S12, a message to the GGSN to inform it about the earlier QoS which have been previously stored for this communication connection. This message is, for example, a Decision message comprising the (earlier) QoS information.

In next steps S14 to S18, the network (by the GGSN as a network control element) may initialize a modification of the communication connection (the PDP context). Such a modification includes, for example, the reestablishment of the communication connection with the QoS which was allocated before the service flow being terminated was identified. The respective (earlier) QoS information are received by the GGSN from the PDF in step S13. The GGSN sends, in step S14, an Update PDP context request message to the SGSN for initiating the modification (updating) of the communication connection. This Update PDP context request message indicates the earlier QoS. In step S15, the SGSN sends a corresponding Modify PDP context request to the UE. When the UE is prepared to accept the modification of the communication connection (i.e. the earlier QoS), it answers in step S16 with a corresponding Modify PDP context accept message to the SGSN. Furthermore, a Radio Access Bearer modification procedure between the UE, the RNC and the SGSN is executed (step S17). In step S18, an Update PDP context accept message is send from the SGSN to the GGSN for indicating the acceptance of the modification of the communication connection.

In the following, a further example of the communication connection parameter or network resource control mechanism according to the present specification is described.

Also the present example of the communication connection parameter or network resource control mechanism is used for controlling communication connection parameters, such as quality of service parameters, policy parameters for charging, and the like, for a communication connection between two network elements or entities in particular in a case where service flows for the communication connection are authorized by a specific authorization network element like a PDF and at least one of the service flows is terminated. It is to be noted that the proposed mechanism is applicable to various types of connections, i.e., for example, to communication connections like a PDP context connection and to application level connections like a IMS session.

Figure 4:
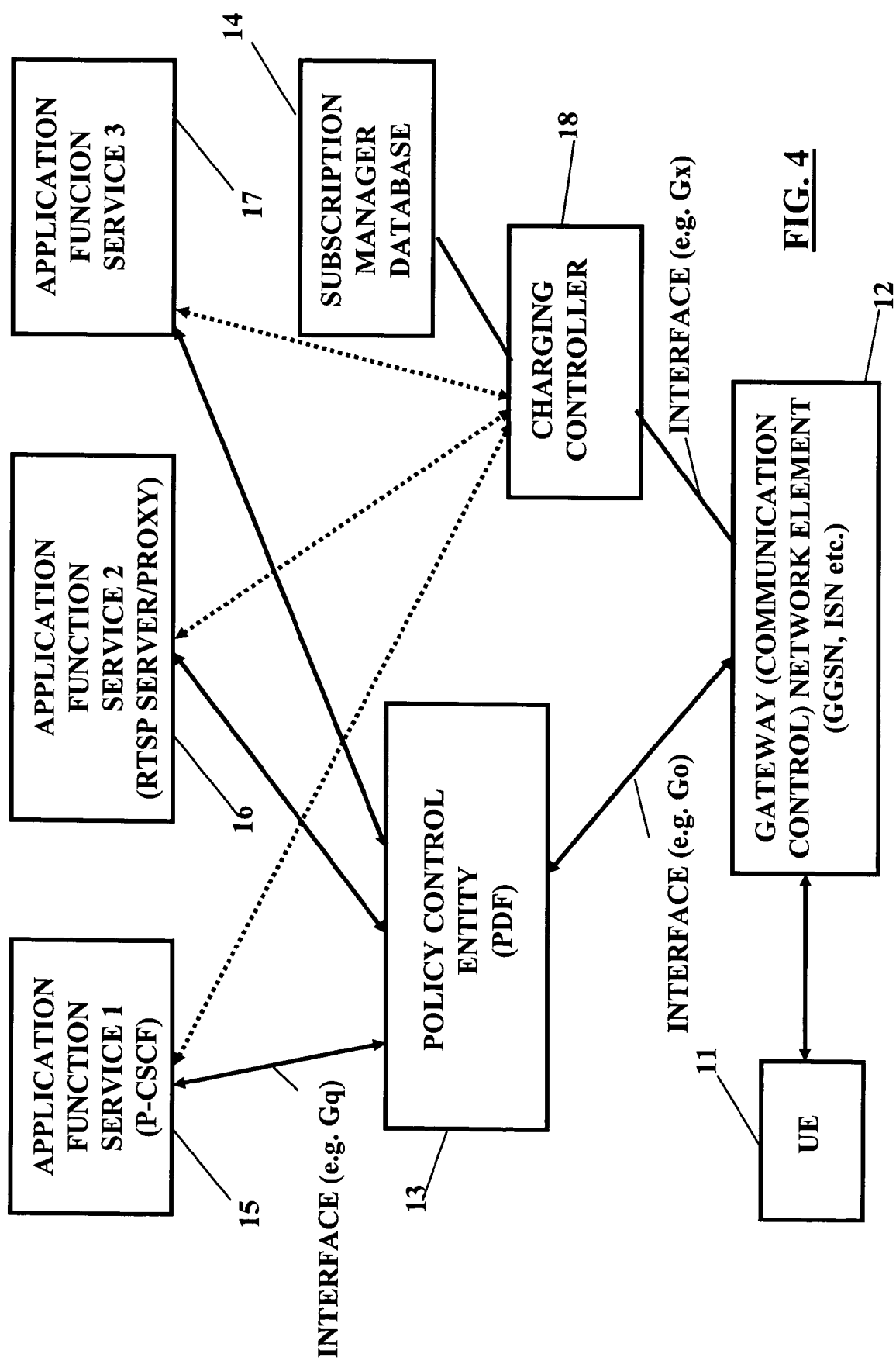
FIG. 4 shows a structure of a part of a communication network to which another embodiment of the invention is applicable.

With reference to FIG. 4, another example for a communication connection scenario is shown by means of which an implementation of the proposed communication connection parameter control mechanism is described. In this example, it is assumed that the communication connection parameter management or control is performed for a communication connection of a user equipment UE in a mobile communication network, such as a 3GPP based network.

Since the described communication connection parameter control mechanism is related in particular to an interaction between the core network communication control or gateway network element, such as the GGSN, and the authorization network element like the policy control entity, such as the PDF, the following description is concentrated on these parts of the communication network. However, it is to be understood that for the establishment of the communication connection other network elements are involved, such as a Service GPRS Support Node (SGSN) and a Radio Access Subsystem controlled by a Radio Network Controller (RNC) (both are not shown in FIG. 4). The additional network elements and the configuration of a corresponding communication path are described, for example, in corresponding specifications, such as the 3GPP specifications, which are known for person skilled in the art, so that a detailed description thereof is omitted herein for the sake of simplicity.

In FIG. 4, a simplified structure of a 3GPP based communication network is shown in which the communication connection parameter control is implemented. In FIG. 4, reference sign 11 denotes a user equipment UE, such as a mobile phone or the like, which represents a terminal network element. Reference sign 12 denotes a gateway or communication control network element (first network element), such as a GGSN, which may be located in the core network subsystem of the communication network of the UE 11. Reference sign 13 denotes an authorization network element or policy control entity such as a PDF (e.g. a so-called ISPC) (second network element). Reference sign 14 denotes a subscription manager database connected with the policy control entity 13 and storing, for example, user subscription profiles used for the connection parameter decision by the policy control entity 13. Reference sign 18 denotes a charging controller connected with the subscription manager database 14 and the gateway or communication control network element 12 (by means, for example a so-called Gx interface) and storing, for example, charging rules used for the communication connection parameter decision. It is to be noted that in case of an IPSC, a charging controller and a policy decision function can be implemented in one element or entity. Reference signs 15 to 17 denote respective application function of services 1 to 3 with which the UE 11 may establish a connection using at least one service type, such as a real-time or a non-real-time service. The application functions 15 to 17 have also a connection/interface to the charging controller 18 (dotted arrows) as they have with the PDF 13. The application functions may serve as terminating network elements for a connection/service flow or may provide a further connection to a corresponding terminating network element being connected therewith. Specifically, reference sign 15 denotes a P-CSCF located in a (not shown) IMS, reference sign 16 denotes a Real Time Streaming Protocol (RTSP) Proxy/Server, while reference sign 17 denotes another applicable Application Function. It is to be noted that there may be provided also other application functions or communication networks (not shown) with which the UE 11 may be connected.

For the communication connection and the transmission of signaling messages, respective connections and interfaces between the network elements are provided. The connection between the UE 11 and the GGSN 12 is provided, for example, by means of respective access network (e.g. UTRAN) and core network (e.g. SGSN) subsystems and elements, while the interface between the GGSN 12 and the PDF 13 is a network internal connection.

A respective user equipment (UE) for which the communication connection is to be established may be a terminal apparatus of different type. For example, the UE may be a mobile or fixed phone, a personal computer, a server, a mobile laptop computer, a personal digital assistant (PDA) or the like. Irrespective of its specific type, the UE may comprise several means which are required for its communication functionality. Such means are for example a processor unit for executing instructions and processing data for the communication connection (e.g. transmission content and signaling related data), memory means for storing instructions and data, for serving as a work area of the processor and the like (e.g. ROM, RAM, EEPROM, and the like), input means for inputting data and instructions by software (e.g. floppy diskette, CD-ROM, EEPROM, data interface means, and the like), user interface means for providing monitor and manipulation possibilities to a user (e.g. a screen, a keyboard, a microphone and headset for communication, and the like), and network interface means for establishing a communication connection under the control of the processor unit (e.g. wired or wireless interface means, an antenna, and the like). These means can be integrated within one device (e.g. in case of a mobile or fixed telephone) or in several devices forming the user equipment (e.g. in case of a laptop).

When a connection by using a service type, such as a real-time (for example, Voice over IP call) or a non-real-time service (for example, interactive connection such as browsing) between the first UE and the second UE is to be established, in the case of a first UE originating a service, the first UE initializes the communication connection. This is effected, for example, by sending a communication connection request signaling for at least one service type which is desired to be used in the communication connection to the communication network to which the first UE is connected. More specifically the UE performs a communication connection activation by sending, for example, a packet based data transmission protocol context, such as a Packet Data Protocol (PDP) context, request via an access network subsystem of the connected communication network to the core network subsystem of the connected communication network. The structures of the access network subsystem and core network subsystem depend on the respective communication network type. For existing system, these structures are commonly known for a person skilled in the art. In case of a 3GPP network system, for example, a UMTS Terrestrial Radio Access Network (UTRAN) and/or a GSM/EDGE Radio Access Network (GERAN) on the access network subsystem side as well as a Serving GPRS Support Node SGSN, a Home Location Register HLR, a Gateway GPRS Support Node GGSN and the like on the core network subsystem side may be involved.

The terminating point of the communication connection is, for example, an application function (AF) being part of an application server or an application proxy server. The terminating point is, for example, part of a multimedia system, such as an IP Multimedia System (IMS) or the like, like a Proxy Call State Control Function (P-CSCF).

The communication connection request signaling for at least one service type is received in the core network subsystem by a corresponding first network element, for example a communication control or gateway network element of the core (or backbone) network subsystem like a GGSN (or SGSN) in case of a UMTS network, an ISN, a corresponding WLAN communication control network element like a Packet Data Gateway, a corresponding cdma2000 communication control network element like a Packet Data Service Node (PDSN), or the like. The communication control or gateway network element may be able to trigger a request for a dynamic authorization and/or policy control. Now, in order to authorize and/or control the communication connection parameters for the communication connection, the first network element (GGSN) requests a corresponding authorization and/or control for the connection parameters from a second network element (PDF). Authorization can be used to determine if a particular right can be granted (e.g. if a PDP context request with an APN can be accepted). Control is e.g. about controlling PDP contexts from QoS and charging point of view (what kind of QoS is given to a PDP context, what kind of charging is to be performed for a PDP context). The first network element may be able to trigger a corresponding request to the second network element without having an authorization token or the like. However, it is to be noted that also an authorization token may be used. In other words, an authorization token, service information like service name or service flow name (e.g. emergency service, service related signaling, news, weather etc.), packet classifier and the like can be used as binding information. The second network element is preferably a policy control function element or entity, being for example a generalization of a 3GPP standard policy decision function (PDF) like so-called IP Service Policy Control (ISPC) element. In the following, both PDF and ISPC refer to the generalized PDF. The policy control entity is, for example, a separate network element connected via respective interfaces to other network elements, such as the gateway element and the application functions, or an integrated part of one of these network elements (for example, the P-CSCF, the GGSN and the like).

The network elements used as the first and the second network element, such as the GGSN, an intelligent service node ISN, a service-aware GGSN, the PDF (the ISPC), and the like, may be implemented by software or by hardware. In any case, for executing their respective functions, correspondingly used devices or network elements comprise several means which are required for control and communication functionality. Such means are, for example, a processor unit for executing instructions and processing data (for example, transmission content and signaling related data), memory means for storing instructions and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), and interface means for establishing a communication connection under the control of the processor unit (e.g. wired and wireless interface means, an antenna, and the like). In this connection, it is to be noted that the PDF/ISPC represents (optional) network elements or entities not being directly involved in the establishment of a communication connection.

The policy control entity is arranged to authorize communication connections and/or to control communication connection parameters, such as a quality of service QoS level and/or charging level, for the communication connection for network control element, i.e. the GGSN, by means of a corresponding signaling between these two elements. The signaling comprises, for example, a corresponding request from the GGSN identifying communication connection parameters like an identification of the UE and/or the subscriber, such as an International Mobile Subscriber Identity (IMSI), an IP address of the UE, a mobile subscriber ISDN (MSISDN) or the like of the UE. Furthermore, an identification of a context access point of the communication connection may be included. After deciding on a corresponding authorization and/or control for parameters for the communication connection and on service types which can be provided for the communication connection of the UE, which decision is based, for example, on a user subscription profile stored in the subscription manager database connected to the PDF, the PDF sends a corresponding decision message to the GGSN indicating the authorization and/or control decision.

The above described authorization and/or control procedure is also applicable for the authorization and/or control of one or more service flows which are also authorized and/or controlled by the PDF for the communication connection (e.g. PDP context).

The GGSN receives the decision message from the PDF and processes the decision message in order to determine the communication connection parameters authorized, for example the authorized QoS level. Then the GGSN, as the communication control network element, enforces the authorized parameters in the communication connection of the first network element. During the communication connection, the first network element then receives flows in the service(s) authorized for the communication connection.

On the other hand, the first network element, i.e. the GGSN, is also arranged to determine when a service flow is terminated. This means that the GGSN can become aware of a situation in which a corresponding service flow is ended, for example, when a user terminates a multimedia session or components of a multimedia session with an IMS server/proxy or the like. This termination of a service flow can take place even if the communication connection as such is not terminated, i.e. the PDP context remains established. Also, the termination of one session flow is recognizable by the GGSN even if other service flows (which may also be authorized and/or controlled, e.g. by the PDF) remain established. The processing of such a termination of a service flow is described below with reference to FIG. 5.

Figure 5:
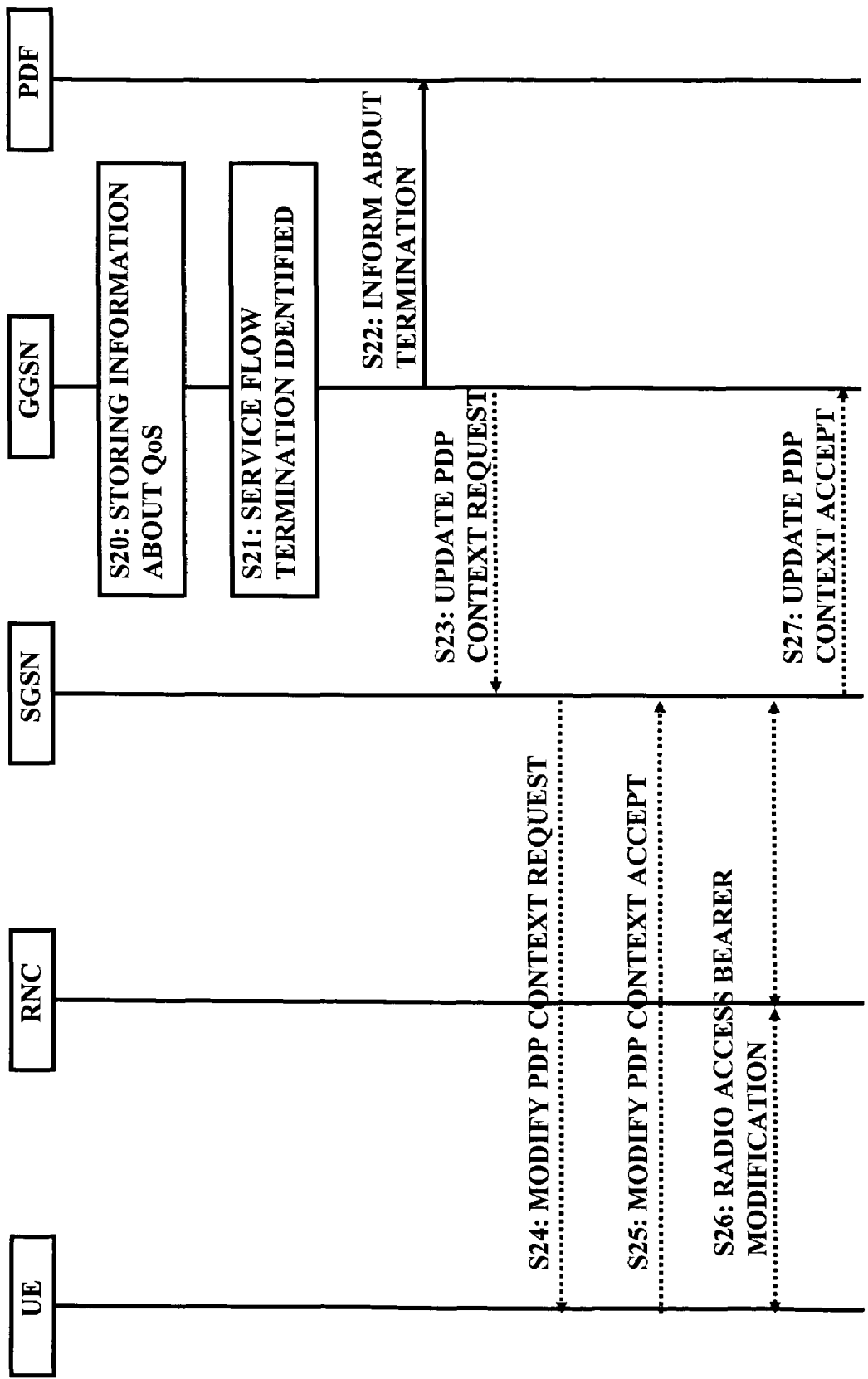
FIG. 5 shows an example of a signaling diagram illustrating a mechanism for the termination of a service flow.

In the signaling diagram of FIG. 5, the network resource control mechanism according to another example when a service flow is terminated is illustrated.

Assuming a case where the PDF was involved in the authorization and/or control of a bearer and/or a service flow for that bearer. In such a case the PDF or the GGSN may have stored service/QoS attributes used for authorizing and/or controlling this bearer and/or service flow. It is to be noted that a corresponding authorization and/or control may also be effected for further service flows for a communication connection controlled by the GGSN.

Designated with step S20, the GGSN stores information about the QoS for a communication connection established. The information about QoS may include information about the earlier QoS and/or the current QoS. By means of this, the GGSN is adapted to initiate a QoS modification to the earlier QoS, for example, when a service flow is terminated. Then, as designated by step S21, the GGSN identifies that the service flow (or one of the service flows) authorized and/or controlled by the PDF is terminated. This determination is performed by the GGSN, for example, by monitoring the data transfer via the service flow(s). For example, when the service flow corresponds to a TCP (Transmission Control Protocol) connection, this determination can be achieved by identifying specific packets closing the TCP connection. As another alternative, the GGSN may also identify such a service flow termination after a certain inactivity time during which no packets of the service flow are carried on the PDP context. The determination may also be based on a timer (not shown), e.g. on a service flow specific timer, in the GGSN which recognizes inactivity. It is to be noted here that also other alternatives for detecting the termination of the service flow may be utilized in connection with this step 1.

Then, in step S22, the GGSN sends a corresponding information about the service flow termination to the PDF. This information may have the form of a Report State message. Another possibility is to use a corresponding Request message by means of which the termination of the service flow is indicated. The information preferably comprises Binding Information which identifies the service flow to be terminated, e.g. by means of the corresponding service flow name or by means of a corresponding packet classifier. An identification of the UE and/or the subscriber, a cAP (context access point) identification and/or a sAP (service Access Point) identification may also be included in Binding Information.

When the PDF receives the information about the service flow termination, it may perform a processing (not shown) for identifying this service flow (or flows) terminated and removes, for example, the service/QoS attributes related to the transmitted Binding Information.

In next steps S23 to S27, the network (by the GGSN as a network control element) may initialize a modification of the communication connection (the PDP context). Such a modification includes, for example, the reestablishment of the communication connection with the QoS which was allocated before the service flow being terminated was identified. The respective (earlier) QoS information can be stored in a storage means (not shown) of the GGSN and retrieved therefrom. The storage of the QoS information (or any other communication connection information or parameter) may be executed just before the establishment of a service flow (or service flows) whose termination is detected later in step S21. The GGSN sends, in step S23, an Update PDP context request message to the SGSN for initiating the modification (updating) of the communication connection. This Update PDP context request message indicates the respective (earlier) QoS being stored in the GGSN. In step S24, the SGSN sends a corresponding Modify PDP context request to the UE. When the UE is prepared to accept the modification of the communication connection (e.g. the earlier QoS), it answers in step S25 with a corresponding Modify PDP context accept message to the SGSN. Furthermore, a Radio Access Bearer modification procedure between the UE, the RNC and the SGSN is executed (step S26). In step S27, an Update PDP context accept message is send from the SGSN to the GGSN for indicating the acceptance of the modification of the communication connection.

Figure 6:
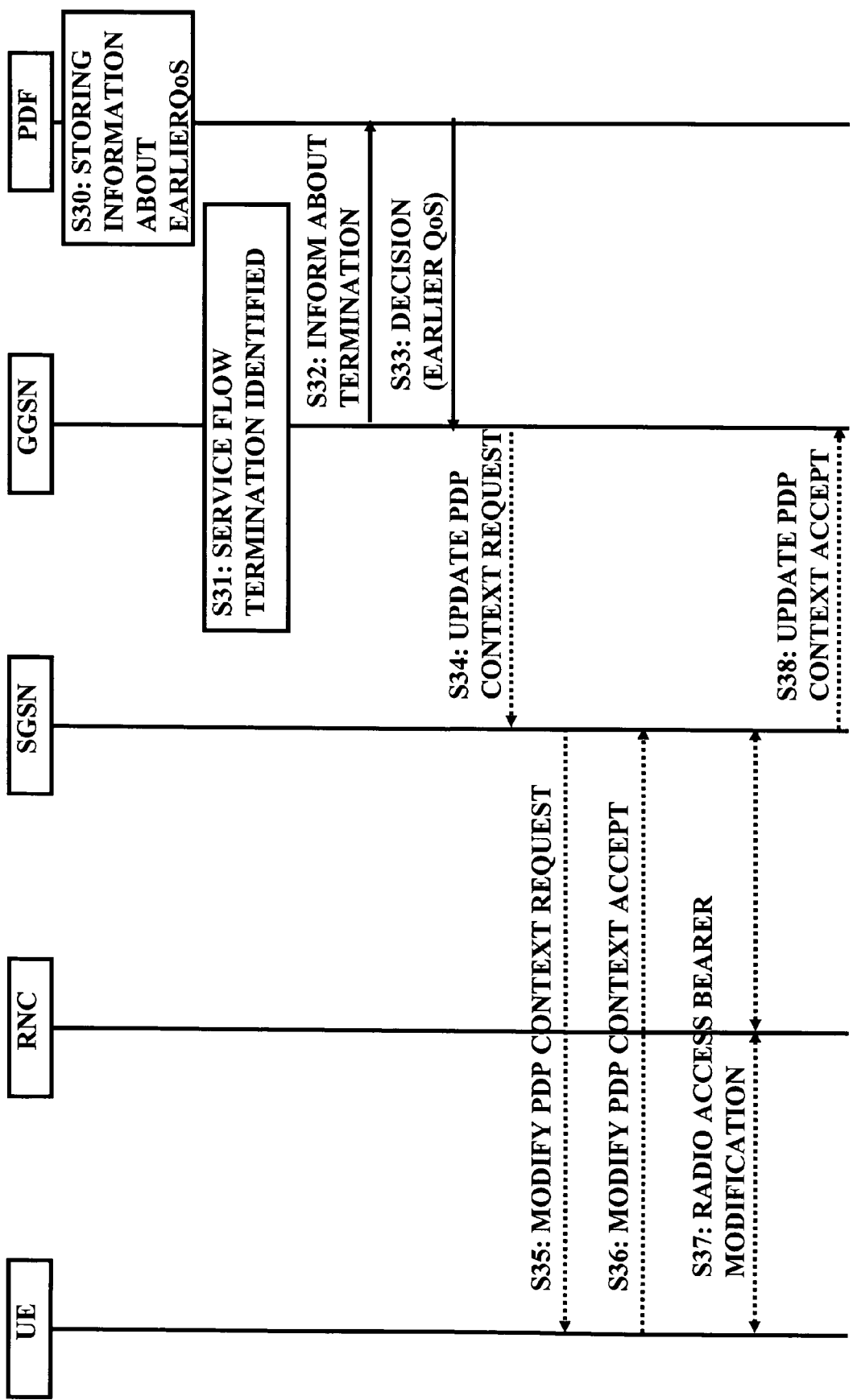
FIG. 6 shows another example of a signaling diagram illustrating a mechanism for the termination of a service flow.

Now, with reference to FIG. 6, a further example for a termination of a service flow is described. This example represents an alternative to the above described procedure of FIG. 5, wherein in the present example QoS information are not stored in the GGSN but in the PDF.

Similarly to the case described in FIG. 5, in the case according to FIG. 6, a case shall be assumed where the PDF was involved in the authorization and/or control of a bearer and/or a service flow for that bearer. In such a case the PDF may have stored service/QoS attributes used for authorizing and/or controlling this bearer and/or service flow. It is to be noted that a corresponding authorization and/or control may also be effected for further service flows for a communication connection controlled by the GGSN.

In step S30, the PDF stores the information about the (earlier) QoS for this communication connection in an associated storing means (not shown). The storage of the QoS information (or any other communication connection information or parameter) may be executed just before the establishment of a service flow (or service flows) whose termination is detected (as described later in step S31). Then, designated by step S31, the GGSN identifies that the service flow (or one of the service flows) authorized and/or controlled by the PDF is terminated. This determination is performed by the GGSN, for example, by monitoring the data transfer via the service flow(s). For example, when the service flow corresponds to a TCP (Transmission Control Protocol) connection, this determination can be achieved by identifying specific packets closing the TCP connection. As another alternative, the GGSN may also identify such a service flow termination after a certain inactivity time during which no packets of the service flow are carried on the PDP context. This determination may also be based on a timer (not shown), e.g. on a service flow specific timer, in the GGSN which recognizes inactivity. It is to be noted here that also other alternatives for detecting the termination of the service flow may be utilized in connection with this step S31.

Then, in step S32, the GGSN sends a corresponding information about the service flow termination to the PDF. This information may have the form of a Report State message. Another possibility is to use a corresponding Request message by means of which the termination of the service flow is indicated. The information preferably comprises Binding Information which identifies the service flow to be terminated, e.g. by means of the corresponding service flow name or by means of a corresponding packet classifier. An identification of the UE and/or the subscriber, a cAP (context access point) identification and/or a sAP (service Access Point) identification may also be included in Binding Information.

When the PDF receives the information about the service flow termination, it may perform a processing (not shown) for identifying this service flow (or flows) terminated and removes, for example, the service/QoS attributes related to the transmitted Binding Information. Furthermore, in step S33, the PDF sends, after it has received the information about the service flow termination in step S32, a message to the GGSN to inform it about the (earlier) QoS which have been previously stored for this communication connection, i.e. to indicate the information about the earlier QoS to the GGSN. This message is, for example, a Decision message comprising the (earlier) QoS information.

In next steps S34 to S38, the network (by the GGSN as a network control element) may initialize a modification of the communication connection (the PDP context). Such a modification includes, for example, the reestablishment of the communication connection with the QoS which was allocated before the service flow being terminated was identified. The respective (earlier) QoS information are received by the GGSN from the PDF in step S33. The GGSN sends, in step S34, an Update PDP context request message to the SGSN for initiating the modification (updating) of the communication connection. This Update PDP context request message indicates the respective (earlier) QoS. In step S35, the SGSN sends a corresponding Modify PDP context request to the UE. When the UE is prepared to accept the modification of the communication connection (e.g. the earlier QoS), it answers in step S36 with a corresponding Modify PDP context accept message to the SGSN. Furthermore, a Radio Access Bearer modification procedure between the UE, the RNC and the SGSN is executed (step S37). In step S38, an Update PDP context accept message is send from the SGSN to the GGSN for indicating the acceptance of the modification of the communication connection.

It is to be noted that not only QoS information may be used for the modification of the communication connection after the indication of the service flow termination, but also other information may be used, such as charging information and the like. This includes both the storage of the respective information and the usage thereof in the modification of the communication connection.

Even though the present invention is described above in connection with a PDP context modification triggered by a service flow termination, it is to be noted that the term "modification" may also be understood as a deactivation. In other words, the modification of the PDP context is a PDP context deactivation. In such a case, the signaling between the system entities is to be modified such that instead of a result of a PDP context modification, a result of a PDP context deactivation is reached. This modifications of the signaling can be based, for example, on the standard signaling used for context deactivation so that a detailed description thereof is omitted herein.

As a further alternative, the present invention is also applicable to a termination of charging. Here, for example, a credit controller which may be a part or function of the charging controller) can be informed on a service flow termination and perform steps to modify/deactivate the charging similar to the steps of the modification/deactivation of the PDP context.

Furthermore, the communication connection is not limited to PDP context but also other types of communication connections are applicable when service flows can be established therein. Moreover, the above mentioned TCP connection can be replaces by another connection type wherein the determination of the service flow termination is adapted accordingly. Additionally, the network control element is not limited to the GGSN. Depending on the used network, the network control element used for the described processing may also be a ISN, sa-GGSN, PDSN (Packet Data Service Node), PDG (Packet Data Gateway) or the like.

As described above, when an authorization and/or control element like a policy control network element is involved in the authorization and/or control of a service flow in a communication connection controlled, a network control element, such as a GGSN, controlling the communication connection determines a termination of the thus authorized and/ or controlled service flow and informs the policy control network element about the termination thereof. The policy control network element may then remove service attributes and/or QoS attributes related to this service flow. Furthermore, the communication connection in the communication network can be modified on the basis of stored information which represents a state before the establishment of the service flow.

It should be understood that the above description and accompanying figures are merely intended to illustrate the present invention by way of example only. The described embodiments of the present invention may thus vary within the scope of the attached claims.

The invention claimed is:

1. A method, comprising:
   determining, in a core network gateway element controlling a communication connection, a termination of at least one existing service flow of an established communication connection, wherein the at least one existing service flow of the established communication connection is a service flow authorized by a policy control element;
   informing, by the core network gateway element, the policy control element about the termination of the at least one existing service flow; and
   receiving from a processor, in the policy control element, the information about the termination of the at least one existing service flow, the information indicating communication connection parameters being equivalent to communication connection parameters before the establishment of the at least one existing service flow for continuing the established communication connection without the at least one existing service flow being terminated.

2. The method according to claim 1, wherein the processing of the information about the termination of the at least one service flow comprises a removing, in the policy control element, at least one of communication connection attributes and service attributes related to the at least one service flow.

3. The method according to claim 1, further comprising, when the at least one service flow is terminated, modifying the communication connection.

4. The method according to claim 3, wherein the modifying of the communication connection in the communication network comprises:
   allocating communication connection parameters being stored in the core network gateway element to the communication connection.

5. The method according to claim 4, wherein the communication connection parameters are equivalent to communication connection parameters before the establishment of the at least one service flow.

6. The method according to claim 3, wherein the modifying of the communication connection comprises:
   transmitting communication connection parameters being stored in the policy control element from the policy control element to the core network gateway element in response to the informing about the termination of the at least one service flow, and
   allocating the communication connection parameters received from the policy control element to the communication connection.

7. The method according to claim 1, wherein the determining of the termination of the at least one service flow authorized by the policy control element comprises monitoring, by the core network gateway element, a data transmission in the at least one service flow authorized by the policy control element.

8. The method according to claim 7, wherein the termination of the at least one service flow is determined when a specific context indicating the closing of a connection is detected in the data transmission in a service flow.

9. The method according to claim 7, wherein the termination of the at least one service flow is determined when it is detected that no packets of the at least one service flow are carried on the communication connection for a predetermined time.

10. The method according to claim 1, wherein the informing of the policy control element about the termination of the at least one service flow authorized by the policy control element comprises a sending a message of a specific type from the core network gateway element to the policy control element which message identifies the at least one service flow determined to be terminated.

11. The method according to claim 1, wherein the communication connection is based on a packet based data transmission.

12. The method according to claim 1, wherein the core network gateway element is a gateway network node, in particular a gateway general packet radio service support node.

13. An apparatus, comprising:
a core network gateway element configured to control a communication connection;
a policy control element configured to perform an authorization for the communication connection controlled by the core network gateway element, wherein the policy control element is further configured to authorize one or more service flows for the communication connection;
a determiner configured to determine the termination of at least one existing service flow of an established communication connection authorized by the policy control element;
an informer configured to inform the policy control element about the termination of the at least one existing service flow authorized by the policy control element; and
a processor configured to receive and process the information about the termination of the at least one existing service flow, the information indicating communication connection parameters being equivalent to communication connection parameters before the establishment of the at least one existing service flow for continuing the established communication connection without the at least one existing service flow being terminated.

14. The apparatus according to claim 13, wherein the processor configured to process the information about the termination of the at least one service flow is further configured to remove at least one of communication connection attributes and service attributes related to the at least one service flow.

15. The apparatus according to claim 13, wherein the core network gateway element further comprises a modifier configured to modify the communication connection on the basis of the termination of the at least one service flow.

16. The apparatus according to claim 15, wherein the modifier is further configured to initiate an allocation of communication connection parameters being stored in the core network gateway element to the communication connection.

17. The apparatus according to claim 16, wherein the communication connection parameters are equivalent to communication connection parameters before an establishment of the at least one service flow.

18. The apparatus according to claim 15, wherein the modifier is further configured to:
receive communication connection parameters being stored in the policy control element and transmitted by the policy control element to the core network gateway element in response to the informing about the termination of the at least one service flow, and
initiate an allocation of the communication connection parameters received from the policy control element to the communication connection.

19. The apparatus according to claim 13, wherein the determiner is further configured to monitor a data transmission in the at least one service flow authorized by the policy control element.

20. The apparatus according to claim 19, wherein the determiner is configured to determine the termination of the at least one service flow when a specific context indicating the closing of a connection is detected in the data transmission in a service flow.

21. The apparatus according to claim 19, wherein the determiner is configured to determine the termination of the at least one service flow when it is detected that no packets of the at least one service flow are carried on the communication connection for a predetermined time.

22. The apparatus according to claim 13, wherein the informer is further configured to send a message of a specific type from the core network gateway element to the policy control element which message identifies the at least one service flow determined to be terminated.

23. The apparatus according to claim 13, wherein the communication connection is based on a packet based data transmission.

24. The apparatus according to claim 13, wherein the core network gateway element is a gateway network node, in particular a gateway general packet radio service support node.

25. An apparatus, comprising:
a controller configured to control network resources of a communication connection;
a determiner configured to determine the termination of at least one existing service flow of an established communication connection authorized by a policy control element;
an informer configured to inform the policy control element about the termination of the at least one existing service flow authorized by the policy control element;
a processor configured to receive and process the information about the termination of the at least one existing service flow, the information indicating communication connection parameters being equivalent to communication connection parameters before the establishment of the at least one existing service flow for continuing the established communication connection without the at least one existing service flow being terminated, and
wherein the apparatus is comprised in a core network gateway element.

26. The apparatus according to claim 25, wherein the apparatus comprises a modifier configured to modify the communication connection on the basis of the termination of the at least one service flow.

27. The apparatus according to claim 26, wherein the apparatus further comprises a memory configured to store connection parameters, wherein the modifier is further configured to initiate an allocation of the communication connection parameters stored in the memory to the communication connection.

28. The apparatus according to claim 27, wherein the communication connection parameters are equivalent to communication connection parameters before the establishment of the at least one service flow.

29. The apparatus according to claim 26, wherein the modifier is further configured to:
receive communication connection parameters being stored in the policy control element and transmitted by the policy control element to the apparatus in response to the informing about the termination of the at least one service flow, and
initiate an allocation of the communication connection parameters received from the policy control element to the communication connection.

30. The apparatus according to claim 25, wherein the determiner is further configured to monitor a data transmission in the at least one service flow authorized by the policy control element.

31. The apparatus according to claim 30, wherein the determiner is further configured to determine the termination of the at least one service flow when a specific context indicating the closing of a connection is detected in the data transmission in a service flow.

32. The apparatus according to claim 30, wherein the determiner is further configured to determine the termination of the at least one service flow when it is detected that no packets of the at least one service flow are carried on the communication connection for a predetermined time.

33. The apparatus according to claim 25, wherein the informer is further configured to send a message of a specific type to the policy control element, with the informing of the at least one service flow determined to be terminated.

34. The apparatus according to claim 25, wherein the communication connection is based on a packet based data transmission.

35. The apparatus according to claim 25, wherein the apparatus is comprised in a gateway general packet radio service support node.

36. An apparatus, comprising:
a controller configured to control network resources of a communication connection in a communication network;
an authorizer configured to perform an authorization for the communication connection, wherein the authorizer is further configured to authorize one or more service flows for the communication connection which is/are established via the communication connection;
a determiner configured to determine the termination of at least one existing service flow of an established communication connection authorized by the authorizer;
an informer configured to inform the authorizer about the termination of the at least one existing service flow authorized by the authorizer; and
a processor configured to receive and process the information about the termination of the at least one existing service flow, the information indicating communication connection parameters being equivalent to communication connection parameters before the establishment of the at least one existing service flow for continuing the established communication connection without the at least one existing service flow being terminated.

37. A method, comprising:
controlling network resources of a communication connection;
determining, with a determiner, a termination of at least one existing service flow of the an established communication connection, wherein the at least one existing service flow of the established communication connection is a service flow authorized by a policy control element;
informing, with an informer, the policy control element about the termination of the at least one existing service flow, wherein the method is implemented in a core network gateway element; and
a receiver to receive the information about the termination of the at least one existing service flow, the information indicating communication connection parameters being equivalent to communication connection parameters before the establishment of the at least one existing service flow for continuing the established communication connection without the at least one existing service flow being terminated.

38. The method according to claim 37, further comprising:
when the at least one service flow is terminated, modifying the communication connection.

39. The method according to claim 38, further comprising:
storing communication connection parameters, wherein the modifying of the communication connection comprises allocating the stored communication connection parameters to the communication connection.

40. The method according to claim 39, wherein the communication connection parameters are equivalent to communication connection parameters before the establishment of the at feast one service flow.

41. The method according to claim 37, wherein the determining of the termination of the at least one service flow authorized by the policy control element comprises monitoring a data transmission in the at least one service flow authorized by the policy control element.

42. The method according to claim 41, wherein the termination of the at least one service flow is determined when a specific context indicating the closing of a connection is detected in the data transmission in a service flow.

43. The method according to claim 41, wherein the termination of the at least one service flow is determined when it is detected that no packets of the at least one service flow are carried on the communication connection for a predetermined time.

44. The method according to claim 41, wherein the modifying of the communication connection comprises:
receiving communication connection parameters being stored in the policy control element from the policy control element in response to the informing about the termination of the at Least one service flow; and
allocating the communication connection parameters received from the policy control element to the communication connection.

45. The method according to claim 37, wherein the informing of the policy control element about the termination of the at least one service flow authorized by the policy control element comprises sending a message of a specific type to the policy control element which message identifies the at least one service flow determined to be terminated.

46. The method according to claim 37, wherein the communication connection is based on a packet based data transmission.

47. The method according to claim 37, wherein the core network gateway element is a gateway network node, in particular a gateway general packet radio service support node.

48. An apparatus, comprising:
a core network gateway element configured to control a communication connection;
a policy control element configured to perform an authorization for the communication connection controlled by the core network gateway element, wherein the policy control element comprises an authorizer configured to authorize one or more service flows for the communication connection;

a determiner configured to determine the termination of at least one existing service flow of an established communication connection authorized by the policy control element;

an informer configured to inform the policy control element about the termination of the at least one existing service flow authorized by the policy control element; and a processor configured to process and to receive the information about the termination of the at least one existing service, the information indicating communication connection parameters being equivalent to communication connection parameters before the establishment of the at least one existing service flow for continuing the established communication connection without the at least one existing service flow being terminated.

49. An apparatus, comprising:

controlling means for controlling network resources of a communication connection;

determining means for determining the termination of at least one existing service flow of an established communication connection authorized by a policy control element;

informing means for informing the policy control element about the termination of the at least one existing service flow authorized by the policy control element; and a processor configured to receive and process the information about the termination of the at least one existing service flow, the information indicating communication connection parameters being equivalent to communication connection parameters before the establishment of the at least one existing service flow for continuing the established communication connection without the at least one existing service flow being terminated;

wherein the apparatus is comprised in a core network gateway element.

50. An apparatus, comprising:

an authorizer configured to perform an authorization for a communication connection via a core network gateway element, wherein the authorizer is further configured to authorize one or more service flows for the communication connection which is/are established via the communication connection;

a receiver configured to receive an information from the core network gateway element indicating a termination of at least one existing service flow of an established communication connection authorized by the authorizer;

a processor configured to process the received information indicating the termination of the at least one existing service flow; and a transmitter configured to transmit, in response to the information, a message indicating communication connection parameters being equivalent to communication connection parameters before the establishment of the at least one existing service flow for continuing the established communication connection without the at least one existing service flow being terminated.

51. The apparatus according to claim 50, further comprising:

a memory configured to store the communication connection parameters being equivalent to communication connection parameters before the establishment of the at least one service flow when the authorizer authorizes the one or more service flows for the communication connection which is/are established via the communication connection.

52. A method, comprising:

authorizing a communication connection via a core network gateway element, wherein the authorizing further comprises authorizing one or more service flows for the communication connection which is/are established via the communication connection;

receiving an information from the core network gateway element indicating a termination of at least one existing service flow of an established communication connection authorized;

processing, with a processor, the received information indicating the termination of the at least one existing service flow; and transmitting, with a transmitter, in response to the information, a message indicating communication connection parameters being equivalent to communication connection parameters before the establishment of the at least one existing service flow for continuing the established communication connection without the at least one existing service flow being terminated.

53. The method according to claim 52, further comprising:

storing the communication connection parameters being equivalent to communication connection parameters before the establishment of the at least one service flow when authorizing the one or more service flows for the communication connection which is/are established via the communication connection.

54. An apparatus, comprising:

a controller configured to control network resources of a communication connection;

a determiner configured to determine the termination of at least one existing service flow of an established communication connection authorized by a policy control element;

an informer configured to inform the policy control element about the termination of the at least one existing service flow authorized by the policy control element; and a modifier configured to initiate a modification of the communication connection for continuing the communication connection without the at least one existing service flow being terminated on the basis of communication connection parameters being equivalent to communication connection parameters before the establishment of the at least one existing service flow;

herein the apparatus is comprised in a core network gateway element.

55. The apparatus according to claim 54, further comprising:

memory configured to store communication connection parameters being equivalent to communication connection parameters before the establishment of the at least one service flow, herein the modifier is further configured to initiate the modification by allocating the communication connection parameters stored in the memory to the communication connection.

56. The apparatus according to claim 54, further comprising:
a receiver configured to receive communication connection parameters from the policy control element in response to the informing about the termination of the at least one service flow, wherein the received communication connection parameters are equivalent to communication connection parameters before the establishment of the at least one service flow, and wherein the modifier is further configured to initiate the modification by allocating the communication connection parameters received from the policy control element to the communication connection.

* * * * *

UNITED STATES PATENT AND TRADEMARK OFFICE
CERTIFICATE OF CORRECTION

PATENT NO. : 7,623,530 B2
APPLICATION NO. : 10/953360
DATED : November 24, 2009
INVENTOR(S) : Tuija Hurtta It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Twenty-sixth Day of October, 2010

David J. Kappos
*Director of the United States Patent and Trademark Office*